Inventor
Oliver Pivert

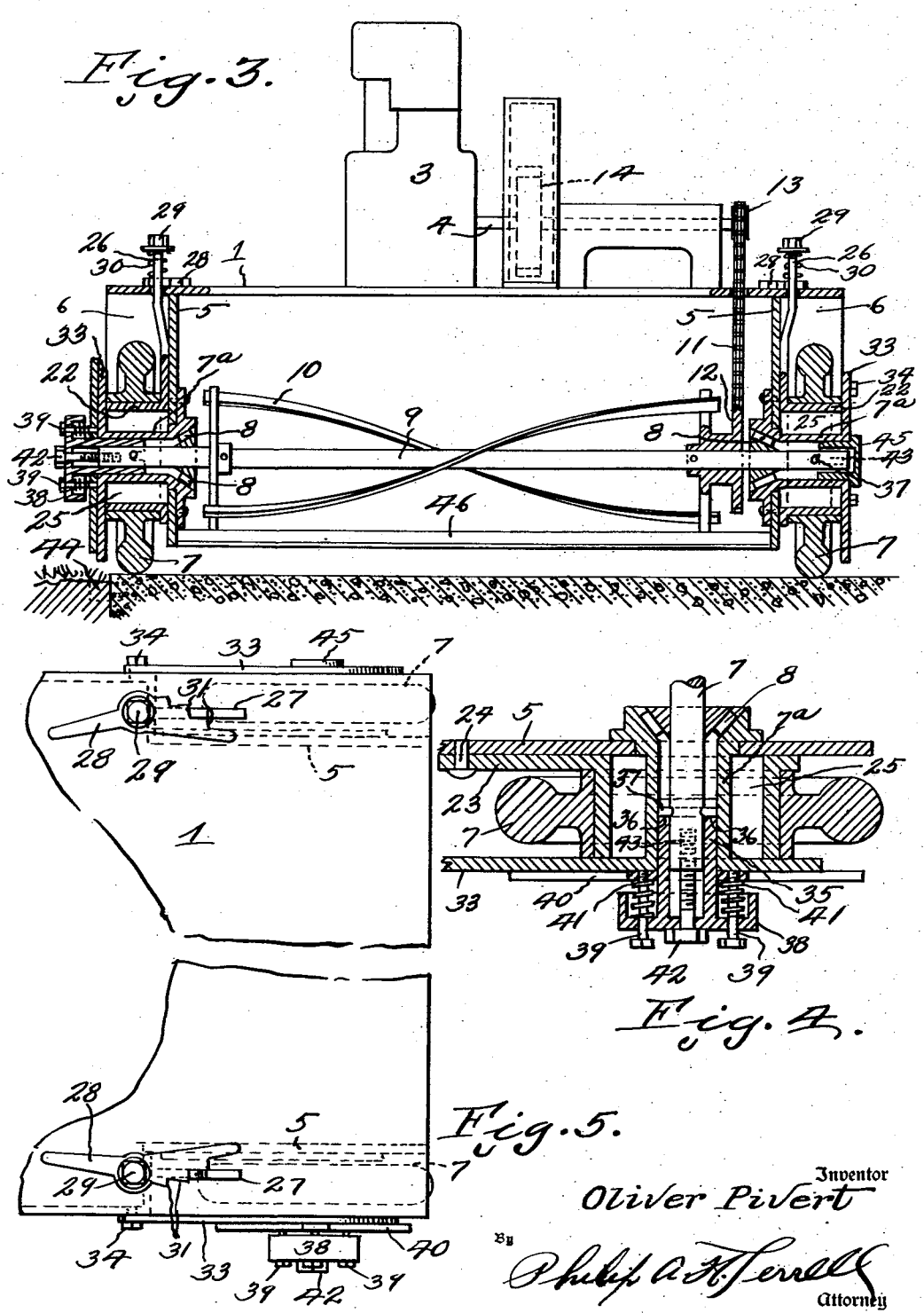

Patented July 22, 1952

2,603,931

UNITED STATES PATENT OFFICE 2,603,931

LAWN EDGER FOR LAWN MOWERS

Oliver Pivert, New Orleans, La.

Application June 8, 1951, Serial No. 230,616

4 Claims. (Cl. 56—25.4)

The invention relates to lawn mower edger attachments, and has for its object to provide a device of this kind which may be easily and quickly attached to the lawn mower on the cutter reel shaft for edging a lawn by a rotating cutter, which cutter can be lowered to a point below the lower side of the lawn mower wheels.

A further object is to provide the outer end of the reel shaft with a removable rotatable cutter to the outside of the lawn mower wheel, and to provide means whereby the axis of the wheel may be adjusted upwardly on the frame of the lawn mower for lowering the cutter to an edge cutting position.

A further object is to extend the ends of the reel cutter shaft beyond the sides of the frame through a bearing sleeve, and to provide pivoted levers carried by the sides of the lawn mower frame, and having bearing sleeves surrounding the first mentioned sleeves in spaced relation, and to rotatably mount the wheels on the last mentioned sleeves and means in connection with the levers whereby their sleeves and wheels may be adjusted upwardly or downwardly for lowering a cutter to an edge trimming position.

A further object is to form the cutter blade carrying attachment from a sleeve telescopically extending over the end of the reel shaft into interengagement therewith, and to secure said attachment to the shaft end by a bolt. Also to yieldably connect the cutter to the attachment so that the cutter is yieldably forced against the shearing plate.

A further object is to provide the pivoted levers with upwardly extending arms, and latching members cooperating with said arms for holding them in various adjusted positions.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a vertical transverse sectional view taken on line 3—3 of Figure 1.

Figure 4 is an enlarged horizontal sectional view taken on line 4—4 of Figure 1.

Figure 5 is a top plan view of the forward end of the lawn mower.

Figure 1:
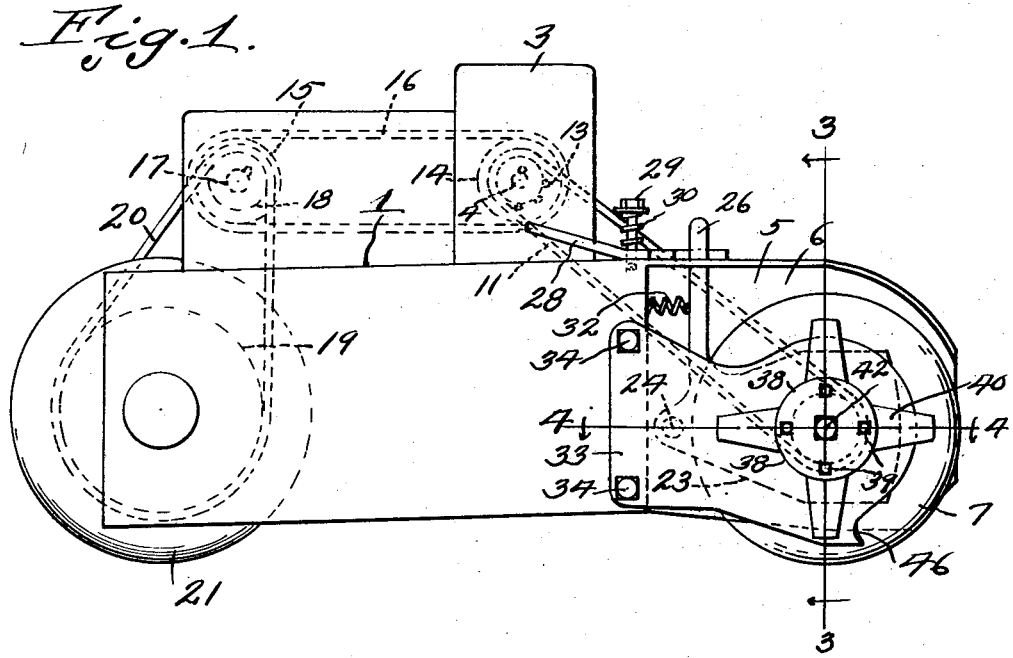
Figure 1 is a side elevation of the mowing machine showing the attachment applied thereto.

The lawn mower is of conventional type, preferably the rear drive or pusher kind, and comprises a substantially rectangular shaped frame 1 having side walls 2.

Mounted on the frame 1 is a conventional form of internal combustion engine 3 driving a shaft 4. The forward ends of the side walls 2 terminate in inwardly off-set portions 5, thereby forming chambers 6 at the forward end of the machine, and in which chambers the forward supporting wheels 7 are disposed, clearly shown in Figure 3.

Extending outwardly through the walls or off-set portions 5 are bearing sleeves 7a having bearings 8 therein. Rotatably mounted in the bearings 8 are the ends of the reel shaft 9, which reel shaft and reel 10 are rotated by a sprocket-chain 11, which chain extends over a sprocket 12 and over a driven sprocket 13 on the outer end of the drive shaft 4. Also mounted on the drive shaft 4 is a pulley 14, and extending over said pulley and a pulley 15, at the rear of the machine, is an endless drive member 16. Pulley 15 is mounted on a shaft 17, and extending over a pulley 18, carried by the shaft 17 and driven pulley 19, is an endless drive belt or chain 20 which drives the rear wheel 21 of the lawn mower. It will be noted that the front wheels are not driven.

Figure 2:
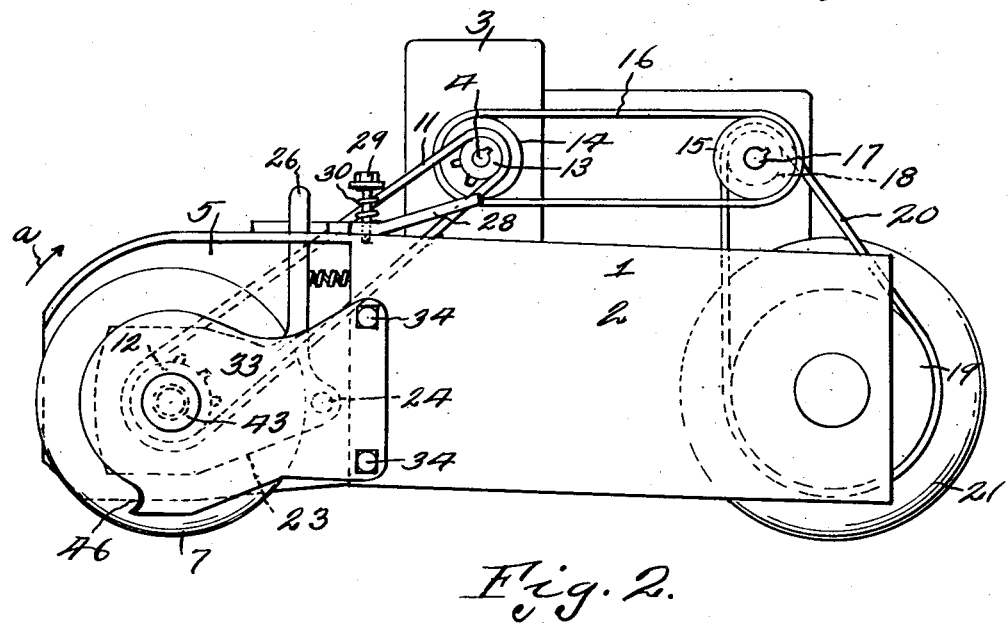
Figure 2 is a side elevation of the mowing machine showing the reverse side thereof from that shown in Figure 1.

Bearing sleeves 7a surround the outer ends of the reel shaft 9, as shown in Figure 3. The front wheels 7 are mounted on cylindrical sleeves 22 which sleeves extend outwardly and are carried by pivoted levers 23, which levers are pivoted at 24 to the walls 5 adjacent the inner ends of the walls. In operation, the lower end of the frame is lowered incident to its weight by an upward pivoting of the levers 23 in the direction of the arrow a, Figure 2, and during this movement the bearing sleeves 7a carrying the ends of the reel shaft 9 move downwardly in the annular chambers 25 formed around the sleeves 7a by the relatively large wheel bearing sleeves 22, as shown in Figure 3. Levers 23 are provided with upwardly extending arms 26 extending upwardly through elongated slots 27 in the top of the frame 1, and in the path of a pivoted adjusting latch 28 on each side of the frame, clearly shown in Figure 5. Pivoted latches 28 are carried by vertical bolts 29, and interposed between the upper ends of the bolts 29 and the latches 28, are expansion springs 30, which springs bear downwardly on the levers 28, preventing easy movement thereof after proper adjustment for holding the levers 26 in adjusted positions against any of the notches or shoulders 31 of the levers.

Interposed between the upwardly extending levers 26 and the adjacent portions of the frame 1 are expansion springs 32, however the expansion springs 32 are held against any action on the levers 26, after they have once been adjusted, by the weight of the forward end of the machine.

The outer ends of the bearing sleeves 7a terminate in cutter engaging plates 33, which plates may be welded or otherwise secured to the sleeves 7a. The rear ends of the plates 33 are secured, by means of bolts 34, to the sides 2 of the frame, hence the plates are rigidly mounted and in combination with the levers 23 and wheel bearing sleeves 22 an annular channel is formed in which the wheels can freely float upwardly or downwardly according to the adjustment of the lever arms 26.

The cutter attachment, which may be applied to either end of the shaft 9, comprises a sleeve 35 fitting in the outer end of either bearing sleeve 7a, as shown in Figure 4, and telescopically engages over the outer end of the shaft so that its diametric notches 36 will receive the pin ends 37 carried by the shaft end. It will be noted that when the shaft 9 rotates the attachment sleeve 35 will rotate therewith. The attachment sleeve extends outwardly and terminates in an annular flange 38, which flange carries axially movable bolts 39. The inner ends of the bolts are connected to a radial arm cutter 40, which cutter is slidable on the sleeve 35 and is urged against the cutter plate 33 by means of the expansion springs 41. The sleeve 35 is held in interengagement with the pin ends 37 by means of a single securing bolt 42, which bolt extends through the outer end of the sleeve 35 and is threaded at 43 axially into the end of the shaft 9. Both ends of the shaft are similarly constructed so that the cutting attachment can be applied to either side of the machine to be lowered to a cutting position in relation to a lawn edge 44, as shown in Figure 3. It will be noted that the cutter attachment can be easily and quickly shifted from side to side, as desired, according to the edging operation, and the side not in use can be closed by a cap 45, if desired.

It will also be noted that instead of the attachment, a tool flexible shaft may be attached for use in operating hedge trimmers and other types of cutters.

The reel 10 cooperates with a conventional form of shearing or cutter bar 46.

From the above it will be seen that a lawn mower is provided, the wheels of which are carried by bearing sleeves, which sleeves in turn are carried by levers adjustably mounted on a lawn mower frame in a manner whereby the wheels may be moved upwardly for allowing the forward end of a lawn mower to move downwardly and bring an edging tool to a position sufficiently low whereby the edge of the lawn may be trimmed. It will be noted that the shearing plates are provided with grooving or ground scoring edges 46, and that the rotatable blades of the cutter 40 will shear the vegetation at the point 46. The driving mechanism shown is of conventional form and schematically shown, it being understood that any kind of driving mechanism for the reel and propelling wheel may be used, even those including clutch means for preventing the movement of the driving wheel when the device is used as a power take-off for auxiliary tools, as described above.

The invention having been set forth what is claimed as new and useful is:

1. The combination with a lawn mower comprising a frame, a reel shaft extending transversely through said frame, bearing sleeves carried by the sides of the frame and through which the ends of the reel shaft extend, pivoted wheel carrying levers pivoted to the outer sides of the frame, said wheel carrying levers having annular sleeves of greater diameter than the bearings thereby forming annular chambers around the bearings, ground engaging wheels rotatably mounted on the lever sleeves, a lawn edge cutter detachably connected to the outer end of one of said reel shaft ends, said bearings having shearing plates engaging the outer ends of the lever sleeves and means for pivotally moving the levers upwardly or downwardly for moving the lawn edge trimmer to a lawn edge cutting position or to an inoperative position.

2. A device as set forth in claim 1 wherein the bearings are provided with sleeves of greater diameter than the diameter of the shaft ends, said cutter comprising a rotatable cutter blade, a flanged sleeve extending into the bearing sleeves and interengaged in telescopic relation over the shaft end, the outer end of the telescopic sleeve being flanged, bolts extending through said flange and connected to the cutter blades and expansion springs interposed between the flange and the cutter blades and forming means for urging said cutter blades into face engagement with the shearing plate, and a bolt extending through the flanged sleeve and threaded axially into the shaft end.

3. A device as set forth in claim 1 wherein the cutter blade can be attached to either end of the reel shaft.

4. A device as set forth in claim 1 wherein the means for moving the pivoted levers comprises upwardly extending arms terminating above the frame and notched levers cooperating with said arms for holding the levers in adjusted positions.

OLIVER PIVERT.

REFERENCES CITED

The following references are of record in the file of this patent:

UNITED STATES PATENTS

| Number | Name | Date |
|---|---|---|
| 1,054,320 | Slatter | Feb. 25, 1913 |
| 1,741,709 | Orr | Dec. 31, 1929 |
| 2,148,841 | Senior | Feb. 28, 1939 |
| 2,185,659 | Chernow | Jan. 2, 1940 |
| 2,200,368 | Iverson | May 14, 1940 |
| 2,489,383 | May | Nov. 29, 1949 |
| 2,505,377 | Barker et al. | Apr. 25, 1950 |
| 2,515,732 | Parry | July 18, 1950 |
| 2,521,033 | Bell | Sept. 5, 1950 |